United States Patent [19]

LaJoie et al.

[11] Patent Number: 5,874,102
[45] Date of Patent: Feb. 23, 1999

[54] ENCAPSULATED DIETARY FATTY ACID SALT PRODUCTS FOR RUMINANTS

[75] Inventors: M. Stephen LaJoie, Basking Ridge; Kenneth R. Cummings, Skillman, both of N.J.

[73] Assignee: Church & Dwight Co., Inc., Princeton, N.J.

[21] Appl. No.: 40,911

[22] Filed: Mar. 30, 1993

Related U.S. Application Data

[63] Continuation of Ser. No. 853,965, Mar. 20, 1992, abandoned.

[51] Int. Cl.$^6$ .................................................. A23K 1/18
[52] U.S. Cl. .......................... 424/438; 424/490; 424/498; 424/502; 426/807
[58] Field of Search ..................................... 424/438, 490, 424/498, 502; 426/807

[56] References Cited

U.S. PATENT DOCUMENTS

| | | | |
|---|---|---|---|
| 3,925,560 | 12/1975 | Scott et al. | 426/2 |
| 4,181,710 | 1/1980 | Dannelly et al. | 424/33 |
| 4,595,584 | 6/1986 | Wu | 424/438 |
| 4,642,317 | 2/1987 | Palmquist | 514/558 |
| 4,876,097 | 10/1989 | Autant | 424/438 |
| 4,877,621 | 10/1989 | Ardaillon | 424/498 |
| 4,996,067 | 2/1991 | Kobayashi | 424/428 |
| 5,077,052 | 12/1991 | Franzoni | 424/438 |
| 5,098,718 | 3/1992 | Ardaillon | 424/438 |

OTHER PUBLICATIONS

The Merck Index—10$^{th}$ ed. —Merck & Co, Inc. p. 8920, 1983.

*Primary Examiner*—D. Gabrielle Phelan
*Attorney, Agent, or Firm*—Irvina Fishman

[57] ABSTRACT

This invention provides a dietary fatty acid salt product in granulated form which optionally contains one or more additional nutrient or medicament ingredients. The dietary product can function as a rumen bypass animal feed supplement, and permit a beneficial increase in the nutrient fat content of the feed. An important aspect of the invention is the encapsulation of the granules with a polymeric coating which functions as an impermeable barrier to one or more volatile organic compounds contained in the core matrix.

19 Claims, No Drawings

ENCAPSULATED DIETARY FATTY ACID SALT PRODUCTS FOR RUMINANTS

This application is a continuation of application Ser. No. 07/853,965, filed Mar. 20, 1992, now abandoned.

CROSS-REFERENCE TO RELATED APPLICATION

The subject matter of the present patent application is related to that disclosed in patent application Ser. No. 07/761,235, filed Sep. 17, 1991, now U.S. Pat. No. 5,250,714.

BACKGROUND OF THE INVENTION

Conventional cattle feeds such as corn and alfalfa often fail to provide sufficient energy for cattle, especially lactating dairy cattle during periods of heavy milk production. Feed containing a high proportion of corn also has a tendency to depress the milk fat content of the milk produced by such cattle. Fat is a concentrated energy source, and it is known that if the proportion of fat in cattle feed is increased, lactating dairy cattle produce high milk yields without draining their reserves of body fat and without diminishing the proportion of milk fat in the milk produced.

However, it has been found that if the proportion of fat in the diet of cattle exceeds about 5% of the total feed solids, the feed has toxic effects upon the microorganisms in the rumen of the cattle. It appears that fat reduces the growth rate or even kills certain microorganisms which digest fiber in the cow's rumen, thereby lowering fiber digestibility. This deleterious effect on the cow's rumen is particularly true of unsaturated fats. Although the decreased fiber digestion in the rumen is partially compensated by greater fiber digestion in the lower parts of the alimentary canal, the total energy derived is less than that resulting from more complete microbial digestion in the rumen.

There has been a continuing need for new dietary supplements for animal feed which can be fed to ruminant animals without interfering with the rumen microorganisms, or being rendered ineffective by the rumen microorganisms.

U.S. Pat. Nos. 4,642,317; 4,826,694; 4,853,233; and 4,909,138 describe the incorporation of insoluble fatty acid salts in ruminant feed as a means of increasing the fat content of the feed without deleteriously affecting the ruminant digestion cycle. A feed additive such as fatty acid calcium salt functions as a rumen inert product which passes through the rumen without interfering with rumen fermentation (i.e., a rumen bypass product), and is subsequently metabolized in the abomasum or small intestine of the ruminant.

A disadvantage associated with the use of fatty acid salt products as feed additives is a characteristic unpleasant odor, which derives from a content of one or more volatile organic oxygenates in the feed additives.

Accordingly, it is an object of the invention to provide a fatty acid salt composition which can function as a rumen bypass animal feed supplement, and permit a beneficial increase in the dietary fat content of the feed.

It is another object of this invention to provide a fatty acid salt dietary supplement product which contains one or more additional biologically active nutrient or medicament ingredients which have rumen bypass protection.

It is a further object of this invention to provide an encapsulated dietary fatty acid salt product which is essentially free of unpleasant odor emanation.

Other objects and advantages of the present invention shall become apparent from the accompanying description and examples.

DESCRIPTION OF THE INVENTION

One or more objects of the present invention are accomplished by the provision of a dietary fatty acid salt product consisting of encapsulated granules which comprise:

(A) a core matrix comprising at least one $C_{14}$–$C_{22}$ fatty acid salt of an alkaline earth metal; and (B) a polymeric coating in the form of a continuous film.

The encapsulated granules have a core matrix average particle size in the range between about 100–5000 microns, and a polymeric coating thickness in the range between about 5–50 microns.

The polymeric coating provides an impermeable barrier to one or more volatile organic compounds contained in the core matrix. The polymeric coating prevents the diffusion and emanation of one or more malodorous organic compounds which are contained as impurities in many bulk $C_{14}$–$C_{22}$ fatty acid sources such as palm fatty acid distillate.

The malodorants typically are low molecular weight oxygenated organic compounds, such as carboxylic acids, aldehydes and ketones. Illustrative of malodorants are butyric acid, propionaldehyde and methyl heptyl ketone.

The polymer employed for application of the coating to the core matrix is selected from a variety of chemical types, which are capable of forming a continuous film that functions as an impermeable barrier for containment of volatile organic compounds in the core matrix of the encapsulated granules.

Suitable types of polymers include polysaccharides, polyvinyls, polypeptides, and the like, which are soluble or dispersible in organic solvents or water.

Illustrative of coating polymers are xanthan gum, guar gum, starch, gum arabic, tragacanth gum, dextran, polyvinylpyrrolidone, polyacrylamide, poly(styrene/acrylonitrile), poly(styrene/2-vinylpyridine), poly(ethylene oxide), poly(vinyl acetate), hydroxypropylcellulose, ethylcellulose, cellulose acetate, carboxymethylcellulose, zein, alginate, gelatin, shellac, and the like, as disclosed in references such as U.S. Pat. Nos. 4,194,013; 4,384,004; 4,877,621; and 4,996,067.

In another embodiment this invention provides a dietary fatty acid salt product consisting of encapsulated granules which comprise:

(A) a core matrix comprising (1) at least one $C_{14}$–$C_{22}$ fatty acid salt of an alkaline earth metal, and (2) a biologically active ingredient; and (B) a polymeric coating in the form of a continuous film.

The $C_{14}$–$C_{22}$ fatty acid ingredient is a salt derivative of one or more saturated or unsaturated carboxylic acids such as those derived from beef and mutton tallow, lard, cottonseed oil, palm oil, and the like.

Palm fatty acid distillate is a commercial product produced by distilling the fatty acids present in natural palm oil. A distillate product typically has the following weight percent content:

| | |
|---|---|
| Free fatty acids | 60–90 |
| Water | <1 |
| Triglycerides | 10–40 |
| Unsaponifiables | <3 |

The iodine value is less than 54 and the melting point is about 45° C. The content of peroxides is below 10 milliequivalents of oxygen per kilogram. The fatty acids in the free fatty acids and the triglycerides consist of the following weight percent:

| | |
|---|---|
| Palmitic acid | 38–50 |
| Oleic acid | 35–40 |
| Linoleic acid | 5–10 |
| Stearic acid | 3–6 |
| Lauric acid | 1–3 |

Beef tallow acids are available commercially as a byproduct obtained by alkaline extraction of waste beef fat and subsequent acidification, and normally contain the following weight percent of fatty constituents:

| | |
|---|---|
| Free fatty acids | 60–90 |
| Triglycerides | 10–40 |
| Water | <1 |
| Unsaponifiables | <3 |

The iodine value is less than 50 and the melting point is 40°–45° C. The content of peroxides is less than 10 milliequivalents of oxygen per kilogram. The fatty acids in the free fatty acids and in the triglycerides have the following weight percent content:

| | |
|---|---|
| Palmitic acid | 22–28 |
| Oleic acid | 38–44 |
| Linoleic acid | 3–6 |
| Stearic acid | 18–24 |

Because $C_{14}$–$C_{22}$ fatty acids and glycerides are susceptible to atmospheric oxidation, it is advantageous to incorporate an oil-soluble antioxidant, and a chelating agent to bind any ferric, copper, zinc or other metal capable of catalyzing atmospheric oxidation. Suitable quantities for inclusion in the fatty acid bulk are about 0.03–0.1% or higher of antioxidant as permitted by regulation, and about 0.05–0.3% of chelating agent, based on the weight of fatty acid.

Illustrative of preferred additives are butylated hydroxytoluene antioxidant, and citric acid and ethylenediamine tetraacetate chelating agents. The chelating agent is added in an edible solvent such as propylene glycol to facilitate blending into the fatty acid.

The biologically active ingredient of the invention dietary products can be selected from a broad variety of nutrients and medicaments, either as a single component or as a mixture of components, which are illustrated by the following listing of active molecular species:

1. $C_2$–$C_{22}$ aliphatic carboxylic acids and esters, and alkali metal, ammonium and alkaline earth metal salts which are different than the selected $C_{14}$–$C_{22}$ fatty acid ingredient of the process.

2. sugars and complex carbohydrates which include both water-soluble and water-insoluble monosaccharides, disaccharides and polysaccharides.

Cane molasses is a byproduct from the extraction of sucrose from sugar cane. It is commercially available at standard 79.5° Brix concentration, which has a water content of about 21 weight percent, and a sugar content of 50 weight percent. Sugar beet byproducts also are available as low cost carbohydrate sources.

Whey is a byproduct of the dairy industry. The whey is a dilute solution of lactalbumin, lactose, fats, and the soluble inorganics from milk. Dried whey solids typically have the following composition:

| | |
|---|---|
| Protein | 12.0% |
| Fat | 0.7% |
| Lactose | 60.0% |
| Phosphorus | 0.79% |
| Calcium | 0.87% |
| Ash | 9.7% |

Another source of carbohydrate is derived from the pulp and paper industry which produces large quantities of byproduct lignin sulfonates from wood during the sulfite pulping process. The byproduct is recovered in the form of salts such as ammonium, sodium and magnesium lignin sulfonates.

3. aminoacid ingredients either singly or in combination which include arginine, histidine, isoleucine, leucine, lysine, methionine, phenylalanine, threonine, tryptophan, valine, tyrosine ethyl HCl, alanine, aspartic acid, sodium glutamate, glycine, proline, serine, cysteine ethyl HCl, and the like, and analogs thereof.

4. vitamin ingredients either singly or in combination which include thiamine HCl, riboflavin, pyridoxine HCl, niacin, inositol, choline chloride, calcium pantothenate, biotin, folic acid, ascorbic acid, vitamin $B_{12}$, p-aminobenzoic acid, vitamin A acetate, vitamin K, vitamin D, vitamin E, and the like.

Trace element ingredients include compounds of cobalt, copper manganese, iron, zinc, tin, nickel, chromium, molybdenum, iodine, chlorine, silicon, vanadium, selenium, calcium, magnesium, sodium and potassium.

5. Protein ingredients as obtained from sources such as dried blood or meat meal, cottonseed meal, soy meal, dehydrated alfalfa, dried and sterilized animal and poultry manure, fish meal, liquid or powdered egg, fish solubles, cell cream, rape seed oil (canola oil), and the like.

Protein equivalent ingredients include non-protein nitrogen compounds such as urea, biuret, ammonium phosphate, and the like.

6. medicament ingredients either singly or in combination which include promazine hydrochloride, chloromadionate acetate, chlorotetracycline, sulfamethazine, monensin, sodium monensin, poloxaline, and the like. Oxytetracycline is a preferred antibiotic for cattle prophylaxis.

7. enzymes such as lipolytic proteins which aid feed digestibility, e.g., by hydrolysis of fatty acid glycerides to free fatty acid and glycerol.

The biologically active ingredient quantity employed in the process typically will vary in the range between about 0.05–20 weight percent, based on the weight of $C_{14}$–$C_{22}$ fatty acid salt ingredient.

In another embodiment this invention provides a dietary fatty acid salt product consisting of encapsulated granules which comprise:

(A) a core matrix comprising (1) at least one $C_{14}$–$C_{22}$ fatty acid salt of an alkaline earth metal, and (2) a basic alkali metal compound, wherein the atomic ratio of alkaline earth metal:alkali metal is between about 2:1 and 20:1; and (B) a polymeric coating in the form of a continuous film.

In another embodiment this invention provides a dietary fatty acid salt product consisting of encapsulated granules which comprise:

(A) a core matrix comprising (1) at least one $C_{14}$–$C_{22}$ fatty acid salt of an alkaline earth metal, (2) a basic alkali metal compound, wherein the atomic ratio of alkaline earth metal:alkali metal is between about 2:1 and 20:1, and (3) a biologically active ingredient; and (B) a polymeric coating in the form of a continuous film.

In a further embodiment this invention provides a method of supplying a nutrient supplement to an animal which comprises incorporating an invention dietary product into the animal's dry feed, in an amount which provides at least one weight percent of supplemental nutrients, based on the feed weight.

Production of the core matrix granules before encapsulation is illustrated by a process which comprises (1) forming an admixture of reactive ingredients comprising (a) at least one $C_{14}$–$C_{22}$ fatty acid, (b) between about 0.8–1.2 equivalents of basic alkaline earth metal compound per equivalent of $C_{14}$–$C_{22}$ fatty acid, (c) a quantity of basic alkali metal compound which provides an alkaline earth metal:alkali metal atomic ratio between about 2:1 and 20:1, (d) between about 10–50 weight percent of an aqueous medium, based on the weight of fatty acid, and (e) a biologically active ingredient; and (2) recovering the salt product after completion of the exothermic salt-forming reaction.

The alkaline earth metal ingredient of the process is at least one member selected from the group consisting of basic calcium and magnesium compounds, such as oxides, carbonates, phosphates, hydroxides, and the like. The alkaline earth metal component preferably has a particle size which passes a 100 mesh U.S. standard screen.

The alkali metal ingredient is at least one member selected from the group consisting of basic sodium and potassium and lithium oxides, carbonates, bicarbonates, phosphates, hydroxides, and the like.

The illustrated process for core matrix particle production can be conducted in a batch reactor or as a continuous operation. The fatty acid, alkaline earth metal compound, alkali metal compound, biologically active ingredient and aqueous medium can be admixed simultaneously, or the fatty acid and alkaline earth metal compound can be blended first and then combined with the alkali metal compound, biologically active ingredient and aqueous medium. Alternatively, the alkaline earth metal and alkali earth metal compounds can be premixed, or the alkali metal compound can be pre-dissolved in the aqueous medium before the admixing of process ingredients.

In one processing method the fatty acid is heated to 80°–110° C., and then mixed with the basic alkaline earth metal ingredient. After the aqueous medium, basic alkali metal compound and biologically active ingredient are added to the mixture, there is a short induction period which is followed by an exothermic salt-forming reaction.

The amount of aqueous medium employed is sufficient to support the salt-forming reaction, and preferably is vaporized as steam during the exothermic reaction period to yield a friable fatty acid salt product which is in granule form suitable for encapsulation prior to use as an animal feed supplement.

The biologically active ingredient can be premixed with the $C_{14}$–$C_{22}$ fatty acid, or with the aqueous medium, as determined by the fat-solubility or water-solubility of the biologically active ingredient.

If the biologically active ingredient is sensitive to the alkaline earth metal compound hydration and salt-forming exothermic conditions at the initial reaction stage of the process, the biologically active ingredient can be added at a later reaction stage while the reaction mixture is still in a fluid state.

The application of the coating film to the core matrix granules is accomplished by conventional means such as pan coating, fluidized coating, centrifugal fluidized coating, and the like. The coating polymer usually is dissolved in a suitable solvent such as water, methanol, ethanol, acetone, tetrahydrofuran, ethyl acetate, methylene chloride, toluene, and the like, as appropriate for a selected polymer species. A polymer also can be applied in the form of an emulsion or suspension. After the coating medium is applied to the granules, the solvent medium is removed by evaporation, thereby forming a continuous film which encapsulates the individual granules.

A present invention encapsulated fatty acid salt product is adapted to function as an odor-free rumen bypass dietary supplement in ruminant feed. An important advantage of a present invention dietary supplement composition is the rumen bypass protection which extends to all the biologically active ingredients of the composition, such as aminoacids, vitamins, and the like, which normally are metabolized in the rumen.

An additional advantage is attributable to the impermeable coating feature of an invention dietary product. The coating barrier limits access of ruminal fluids to the matrix under ruminant feeding conditions. The protective film serves to minimize biohydrogenation of unsaturated $C_{14}$–$C_{22}$ fatty acid salts present in the core matrix of the encapsulated granules. Unsaturated fatty acids are an important nutrient element for altering milk fat composition in lactating cattle.

The following Examples are further illustrative of the present invention. The components and specific ingredients are presented as being typical, and various modifications can be derived in view of the foregoing disclosure within the scope of the invention.

EXAMPLE I

This Example illustrates the continuous production of fatty acid calcium salt core matrix granules prior to encapsulation.

The fatty acid component is a palm fatty acid distillate of the following composition:

| Lauric acid | 2.3% |
|---|---|
| Palmitic acid | 49.9% |
| Stearic acid | 5.4% |
| Oleic acid | 35.0% |
| Linoleic acid | 7.4% |

The alkali metal component is introduced as an aqueous potassium carbonate solution. The concentration of the aqueous potassium carbonate solution is calculated to provide the required volume of water to the reaction medium, and provide potassium ions to satisfy a calcium:potassium atomic ratio of about 5:1.

The process is operated continuously with equipment which is essentially the same as described and illustrated with reference to FIG. 1 of U.S. Pat. No. 4,826,694 by W. McAskie.

Calcium oxide from a hopper and hot palm oil distillate (96° C.) from a supply line are mixed in predetermined proportions in a mixing pump. The aqueous potassium carbonate solution is added to the reactant admixture via a supply line.

A sidestream of the aqueous potassium carbonate solution is withdrawn upstream from the salt-forming reaction zone. The sidestream is utilized as a solvent to form a solution of methionine hydroxy analog potassium salt. The sidestream solution is blended back into the main aqueous potassium carbonate stream before it enters the salt-forming reaction zone.

The combined aqueous medium streams are supplied to the reaction zone at a rate which provides about 30 weight percent of water, and 2 weight percent of methionine hydroxy analog potassium salt, based on the weight of palm fatty acid distillate.

The hydrated mixture formed in the process is passed through a mixing pump and the resultant semi-liquid reaction medium at about 100° C. is discharged as a spread layer onto a continuously moving conveyor belt. Steam evolves from the conveyor transported reaction mass.

At the end of the conveyor belt solid lumps of reaction product fall through a sizing machine onto a second conveyor belt. In this conveying zone the salt-forming reaction and evolution of water proceed to completion. The essentially dry fatty acid calcium salt granules are passed through a sifter and collected. The average granule size is about 3000–4000 microns.

The residence time on the first conveyor is about 30 minutes, and the overall production time from reactant mixing to collection of the dry core matrix granules is about 2.5 hours.

The granules have a total fatty acid calcium salt content of 85 weight percent, a methionine hydroxy analog content of 1.5 weight percent, a water content of about 3–5 weight percent, and an ash content of about 15 weight percent.

EXAMPLE II

This Example illustrates the preparation of fatty acid calcium salt core matrix granules which contain vitamin A and trace minerals.

Calcium oxide (100 g), sodium carbonate (15 g) and palm fatty acid distillate (700 g) are admixed, and then the mixture is blended with an aqueous suspension medium (300 g) with stirring. Steam evolves during the exothermic salt-forming reaction, and the final product is in the form of granulated solids.

The aqueous suspension medium starting material employed in the process is prepared with the following ingredients:

| Soy bean meal | 300 g |
|---|---|
| Soy lecithin | 10 g |
| Tricalcium phosphate | 5 g |
| Trace minerals[(1)] | 2 g |
| Vitamin A | 1 g |

The listed ingredients are blended to form a homogeneous dry mixture. The dry mixture is added to one liter of water with high speed stirring to form an aqueous suspension medium.

|  | Weight Ratio |
|---|---|
| [(1)]$CoSO_4 \cdot 7H_2O$ | 4 |
| $CuSO_4 \cdot 5H_2O$ | 5 |
| $MnSO_4 \cdot H_2O$ | 6 |
| $FeSO_4 \cdot 7H_2O$ | 7 |
| $ZnSO_4 \cdot H_2O$ | 3 |

EXAMPLE III

This Example illustrates a general procedure for the preparation of an encapsulated dietary fatty acid salt product in accordance with the present invention.

A fluidized bed vessel is utilized which is equipped with a Wurster air-suspension coater system (WARF) as described in U.S. Pat. No. 4,568,559 and U.S. Pat. No. 4,877,621.

A coating suspension is prepared by stirring an admixture of ethyl alcohol (600 g), 30 g of 2-vinylpyridine/styrene (70:30) copolymer (viscosity, 5 g/liter in DMF at 20° C., 0.560), aluminum powder (30 g), talc powder (30 g) and stearic acid (5 g).

Core matrix granules (600 g) as described in Example I are charged into the coating chamber.

Compressed air is introduced into the coating chamber, and the polymeric coating medium is sprayed on the air-suspended core matrix granules, until the coating weight is about 20% of the total dry weight of the coated granules.

What is claimed is:

1. A dietary fatty acid salt product for ruminants consisting of encapsulated granules which comprise:
   (A) a core matrix comprising at least one $C_{14}$–$C_{22}$ fatty acid salt of calcium or magnesium alkaline earth metal; and
   (B) a polysaccharide, polyvinyl or polypeptide polymeric coating in the form of a continuous film which is an impermeable barrier to volatile organic compounds contained in the core matrix;
   wherein the encapsulated granules have an average particle size between about 100–5000 microns, and a polymeric coating thickness between about 5–50 microns.

2. A product in accordance with claim 1 wherein the polymeric coating prevents the diffusion of one or more malodorous organic compounds contained in the core matrix.

3. A dietary fatty acid salt product for ruminants consisting of encapsulated granules which comprise:
   (A) a core matrix comprising (1) at least one $C_{14}$–$C_{22}$ fatty acid salt of calcium or magnesium alkaline earth metal, and (2) a biologically active ingredient; and
   (B) a polysaccharide, polyvinyl or polypeptide polymeric coating in the form of a continuous film which is an impermeable barrier to volatile organic compounds contained in the core matrix;
   wherein the encapsulated granules have an average particle size between about 100–5000 microns, and a polymeric coating thickness between about 5–50 microns.

4. A product in accordance with claim 3 wherein the polymeric coating prevents diffusion of one or more malodorous organic compounds contained in the core matrix.

5. A dietary fatty acid salt product for ruminants consisting of encapsulated granules which comprise:
   (A) a core matrix comprising (1) at least one $C_{14}$–$C_{22}$ fatty acid salt of calcium or magnesium alkaline earth metal, and (2) a sodium, potassium or lithium basic alkali metal compound, wherein the atomic ratio of alkaline earth metal:alkali metal is between about 2:1 and 20:1; and
   (B) a polysaccharide, polyvinyl or polypeptide polymeric coating in the form of a continuous film which is an impermeable barrier to volatile organic compounds contained in the core matrix;
   wherein the encapsulated granules have an average particle size between about 100–5000 microns, and a polymeric coating thickness between about 5–50 microns.

6. A product in accordance with claim 5 wherein the polymeric coating prevents diffusion of one or more malodorous organic compounds contained in the core matrix.

7. A product in accordance with claim 5 wherein the fatty acid salt ingredient is a mixture comprising 0–10 percent lauric acid, 0–60 percent palmitic acid, 0–10 percent stearic acid, 0–60 percent oleic acid, and 0–10 percent linoleic acid salts.

8. A product in accordance with claim 5 wherein the alkaline earth metal is calcium and the alkali metal is sodium or potassium or a mixture thereof in the core matrix.

9. A dietary fatty acid salt product for ruminants consisting of encapsulated granules which comprise:
(A) a core matrix comprising (1) at least one $C_{14}$–$C_{22}$ fatty acid salt of calcium or magnesium alkaline earth metal, (2) a sodium, potassium or lithium basic alkali metal compound, wherein the atomic ratio of alkaline earth metal:alkali metal is between about 2:1 and 20:1, and (3) a biologically active ingredient; and
(B) a polysaccharide, polyvinyl or polypeptide polymeric coating in the form of a continuous film which is an impermeable barrier to volatile organic compounds contained in the core matrix;

wherein the encapsulated granules have an average particle size between about 100–5000 microns, and a polymeric coating thickness between about 5–50 microns.

10. A product in accordance with claim 9 wherein the polymeric coating prevents diffusion of one or more malodorous organic compounds contained in the core matrix.

11. A product in accordance with claim 9 wherein the fatty acid salt ingredient is a mixture comprising 0–10 percent lauric acid, 0–60 percent palmitic acid, 0–10 percent stearic acid, 0–60 percent oleic acid, and 0–10 percent linoleic acid salts.

12. A product in accordance with claim 9 wherein the alkaline earth metal is calcium and the alkali metal is sodium or potassium or a mixture thereof in the core matrix.

13. A product in accordance with claim 9 wherein the biologically active ingredient is a nutrient.

14. A product in accordance with claim 9 wherein the biologically active ingredient is a medicament.

15. A product in accordance with claim 9 wherein the biologically active ingredient comprises at least one aminoacid.

16. A product in accordance with claim 9 wherein the biologically active ingredient comprises at least one polypeptide.

17. A product in accordance with claim 9 wherein the biologically active ingredient comprises at least one antibiotic.

18. A product in accordance with claim 9 wherein the biologically active ingredient comprises at least one vitamin or trace element.

19. A method of supplying a nutrient supplement to a ruminant animal which comprises incorporating a claim 1 dietary product into the animal's dry feed, in an amount which provides at least one weight percent of supplemental nutrients, based on the feed weight.

* * * * *